United States Patent
Roh

(10) Patent No.: US 9,403,711 B2
(45) Date of Patent: Aug. 2, 2016

(54) APPARATUS AND METHOD FOR MANUFACTURING COVER WINDOW

(71) Applicant: Samsung Display Co., Ltd., Yongin, Gyeonggi-Do (KR)

(72) Inventor: Moon-Seok Roh, Yongin (KR)

(73) Assignee: SAMSUNG DISPLAY CO., LTD. (KR)

( * ) Notice: Subject to any disclaimer, the term of this patent is extended or adjusted under 35 U.S.C. 154(b) by 330 days.

(21) Appl. No.: 14/106,780

(22) Filed: Dec. 15, 2013

(65) Prior Publication Data

US 2014/0367027 A1 Dec. 18, 2014

(30) Foreign Application Priority Data

Jun. 18, 2013 (KR) .......................... 10-2013-0069656

(51) Int. Cl.
*C03B 23/03* (2006.01)
*B29C 65/00* (2006.01)
*C03B 11/06* (2006.01)

(52) U.S. Cl.
CPC ............. *C03B 23/0302* (2013.01); *B29C 66/81* (2013.01); *B29C 66/814* (2013.01); *C03B 11/06* (2013.01)

(58) Field of Classification Search
CPC .. B29C 66/81; B29C 66/814; B29C 66/8141; C03B 23/0302; C03B 23/0305; C03B 11/06
USPC ................................................ 156/285–286
See application file for complete search history.

(56) References Cited

U.S. PATENT DOCUMENTS

| | | | | |
|---|---|---|---|---|
| 4,596,624 A | * | 6/1986 | Frohlich | .............. H05K 3/4611 |
| | | | | 156/285 |
| 2010/0300152 A1 | * | 12/2010 | Dannoux | ............ C03B 23/0305 |
| | | | | 65/66 |

FOREIGN PATENT DOCUMENTS

| | | |
|---|---|---|
| JP | 06-279038 A | 10/1994 |
| KR | 1020100000018 A | 1/2010 |
| KR | 1020110091327 A | 8/2011 |
| KR | 1020140010504 A | 1/2014 |

* cited by examiner

*Primary Examiner* — Christopher Schatz
(74) *Attorney, Agent, or Firm* — Cantor Colburn LLP

(57) ABSTRACT

A cover window manufacturing apparatus includes a plurality of fixed plates, a plurality of moving plates, a plurality of molds and a driver. The plurality of fixed plates is layered and spaced apart at a distance from each other. The plurality of moving plates is layered, spaced apart at a distance from each other and respectively disposed under the plurality of fixed plates. A plurality of connection members integrally connects the plurality of moving plates with each other. The plurality of molds is respectively provided on the plurality of moving plates, and inner spaces for molding the cover window are respectively defined in the plurality of molds. The driver is coupled to one of the plurality of moving plates, and is configured to move the plurality of moving plates towards the plurality of fixed plates such that the plurality of molds are pressed to the plurality of fixed plates.

14 Claims, 5 Drawing Sheets

APPARATUS AND METHOD FOR MANUFACTURING COVER WINDOW

This application claims priority to Korean Patent Application No. 10-2013-0069656 filed on Jun. 18, 2013, and all the benefits accruing therefrom under 35 U.S.C. §119, the entire contents of which are incorporated herein by reference.

BACKGROUND OF THE INVENTION (a) Field

The invention relates to an apparatus for manufacturing a cover window used in a display device and a method for manufacturing a cover window using the same.

(b) Description of the Related Art

A display device includes a display panel provided with a plurality of pixels to display an image, and a transparent cover window covering a display side of the display panel. A touch screen panel may be provided between the display panel and the cover window, for touch recognition. The cover window functions to protect the touch screen panel and the display panel from external impact and/or damage such as scratches generated in use of the cover window.

A variety of display device designs has been developed as the use of various electronic devices such as a smart phone, a tablet personal computer ("PC"), and the like is increased. In order to satisfy such a variety in design, a flexible display panel and a stereoscopic cover window have been proposed.

SUMMARY

One or more exemplary embodiment of the invention provides a cover window manufacturing apparatus which manufactures a relatively large number of cover windows within a predetermined processing time, and a method for manufacturing a cover window using the cover window manufacturing apparatus.

An exemplary embodiment of a cover window manufacturing apparatus according to the invention includes a plurality of fixed plates, a plurality of moving plates, a plurality of molds and a driver. The plurality of fixed plates is layered and spaced apart from each other at a distance. The plurality of moving plates is layered and spaced apart from each other at a distance, and respectively disposed under the plurality of fixed plates. A plurality of connection members integrally connects the plurality of moving plates to each other. The plurality of molds are respectively provided on the plurality of moving plates, and inner spaces for molding the cover window are respectively defined in the plurality of molds. The driver is coupled to one of the plurality of moving plates and is configured to move the plurality of moving plates toward the plurality of fixed plates, such that the plurality of molds are pressed to the plurality of fixed plates.

The plurality of fixed plates, the plurality of moving plates, and the plurality of molds may be provided in a heating member such as a heating furnace.

The plurality of fixed plates may be integrally coupled to each other by a plurality of vertical fixing portions, and lengths of the plurality of vertical fixing portions may be the same such that the distance between adjacent fixed plates is maintained. The lowest fixed plate among the plurality of fixed plates may be fixed to a support disposed in the heating furnace, via a fastening member.

Each of the plurality of moving plates may be provided under a fixed plate among the plurality of fixed plates, and lengths of the plurality of connection members may be the same such that the distance between adjacent moving plates is maintained. A group of more than one mold may be disposed on each of the plurality of moving plates.

Openings may be defined in at least one of the plurality of fixed plates and through which the plurality of connection members respectively extend. The driver may include a hydraulic cylinder including a piston coupled to the lowest moving plate among the plurality of moving plates, and a hydraulic pump configured to provide a hydraulic pressure to the hydraulic cylinder.

Each of the plurality of molds may include a lower side mold portion including one of a convex portion and a concave portion, and an upper side mold portion including the other one of the convex portion and the concave portion. The convex portion and the concave portion may each be defined by a flat surface, and curved surfaces connected to the flat surface.

According to another exemplary embodiment, a method is provided for manufacturing a cover window. The method includes: arranging a plurality of fixed plates and a plurality of moving plates in a heating furnace; arranging a plurality of molds, each including a lower side mold portion, and an upper side mold portion facing the lower side mold portion, on the plurality of moving plates, interposing a flat cover window material such as a flat glass between the facing lower and upper side mold portions; heating the flat glass by operating the heating furnace; and moving the plurality of moving plates toward the plurality of fixed plates, respectively, to apply a molding pressure to the plurality of molds by pressing the plurality of molds to the plurality of fixed plates.

The plurality of fixed plates may be maintained in a constant location in the heating furnace. The moving the plurality of moving plates may include operating a driver coupled to the plurality of moving plates and configured to lift or lower the plurality of moving plates.

The lower side mold portion may include one of a convex portion and a concave portion, the upper side mold portion may include the other one of the convex portion and the concave portion, and the applying the molding pressure to the plurality of molds forms the cover window material including a flat portion and a curved portion.

According to one or more exemplary embodiment, the plurality of moving plates in the heating member are arranged in a layered structure so that a relatively large number of molds can be collectively disposed on the plurality of moving plates at one time and a plurality of molds can be simultaneously applied with a molding pressure using a single driver. Therefore, a larger number of cover windows can be manufactured in a predetermined processing time, thereby being advantageous in mass production of the cover windows.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION

Figure 1:
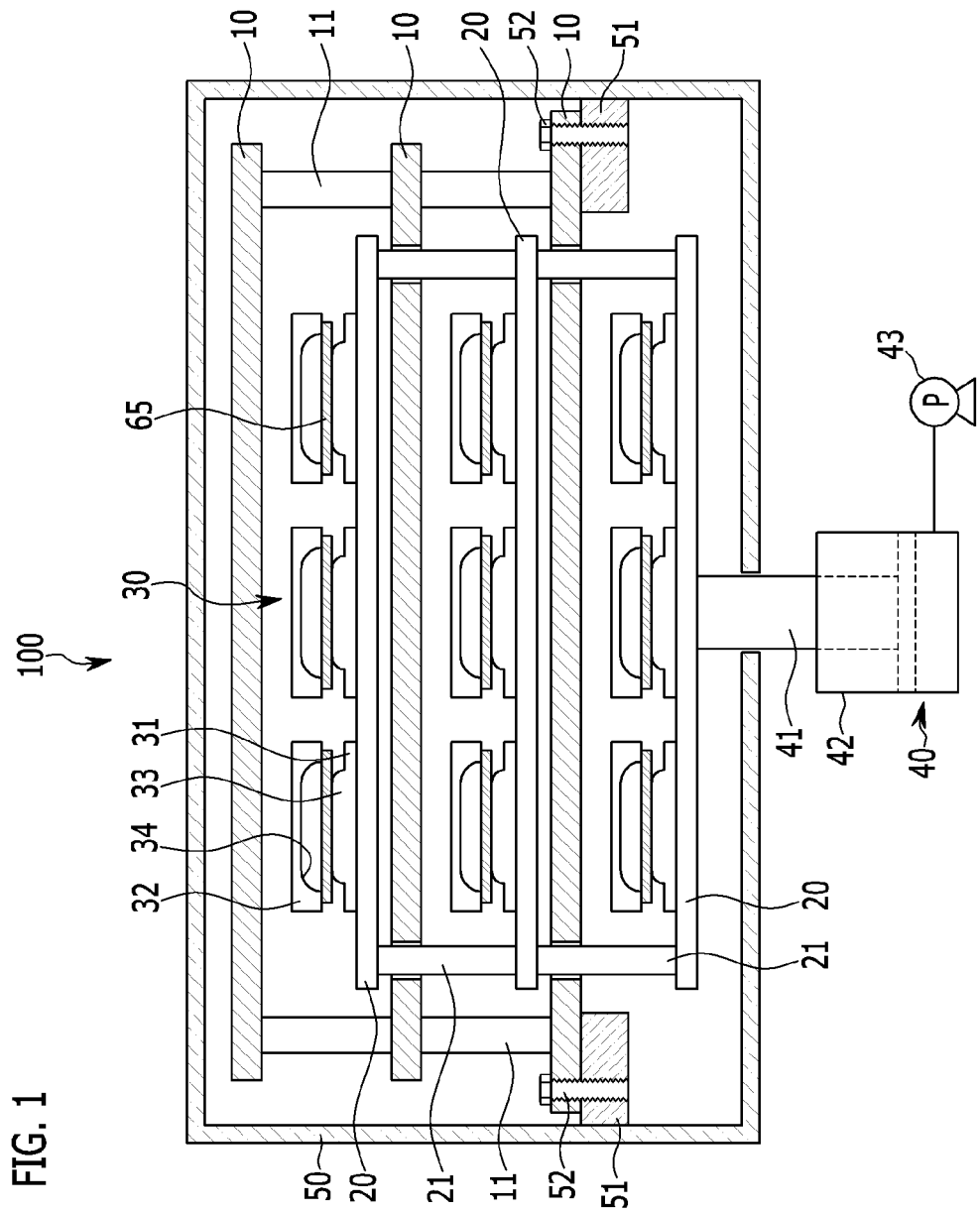
FIG. 1 is a schematic diagram of an exemplary embodiment of a cover window manufacturing apparatus according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. In the specification and claims, unless explicitly described to the contrary, the word "comprise" and variations such as "comprises" or "comprising" will be understood to imply the inclusion of stated elements but not the exclusion of any other elements.

In addition, it will be understood that when an element such as a layer, film, region, or substrate is referred to as being "on" another element, it can be directly on the other element or intervening elements may also be present. As used herein, connected may refer to elements being physically and/or electrically connected to each other. Like numbers refer to like elements throughout. As used herein, the term "and/or" includes any and all combinations of one or more of the associated listed items.

Further, in the specification, the word "on" means positioning on or below the object portion, but does not essentially mean positioning on the upper side of the object portion based on a gravity direction.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

In order to manufacture a stereoscopic cover window using glass, flat glass is disposed on a lower side mold, the mold is heated with a temperature above 800 degrees Celsius (° C.), the flat glass is pressed by using an upper side mold for molding of the cover window, and the molded cover window is cooled. However, with a conventional molding structure, a single cover window is manufactured from a single mold and thus a relatively large amount of cover windows cannot be manufactured within a predetermined processing time. Therefore, there remains a need for an improved apparatus to manufacture a stereoscopic cover and a method thereof, which allows a relative large number of cover windows to be manufactured and decreases processing time of each cover window.

Hereinafter, the invention will be described in detail with reference to the accompanying drawings.

Figure 2:
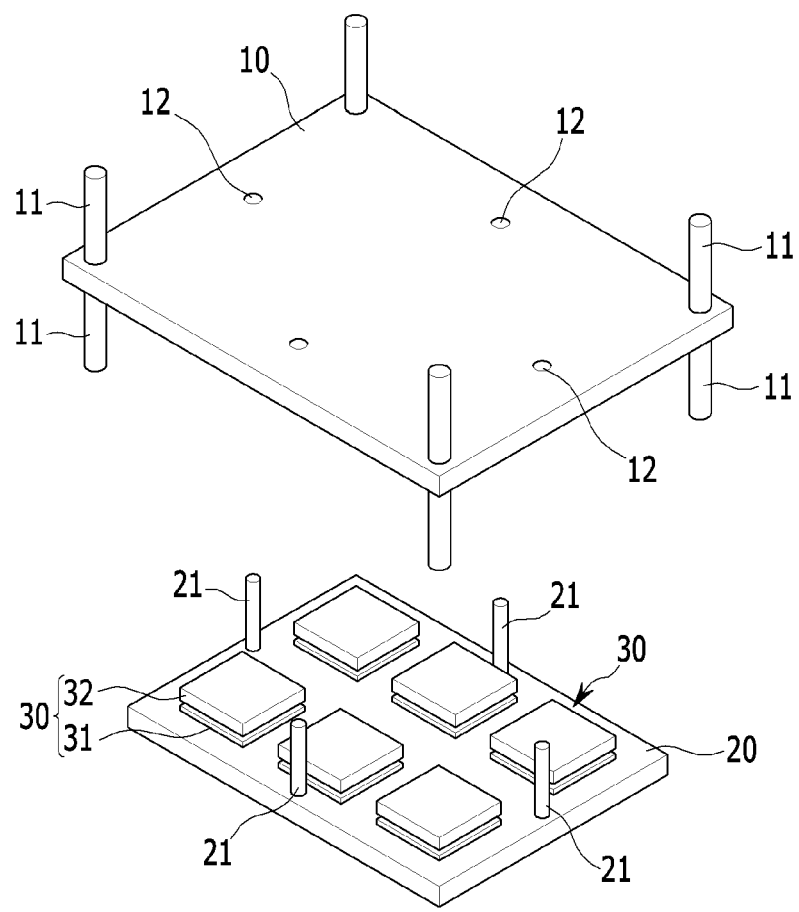
FIG. 2 is an exploded perspective view of a portion of the cover window manufacturing apparatus of FIG. 1.

FIG. 1 is a schematic diagram of an exemplary embodiment of a cover window manufacturing apparatus according to the invention, and FIG. 2 is an exploded perspective view of a portion of the cover window manufacturing apparatus of FIG. 1.

Referring to FIG. 1 and FIG. 2, a cover window manufacturing apparatus 100 includes a plurality of fixed plates 10, a plurality of moving plates 20, a plurality of molds 30 and a driver 40. The plurality of fixed plates 10, the plurality of moving plates 20 and the plurality of molds 30 are provided in a heating member such as a heating furnace 50, and the driver 40 may be located both at the inside and the outside of the heating furnace 50.

The plurality of fixed plates 10 are layered and spaced apart from each other a distance from each other, and the plurality of moving plates 20 are respectively layered and spaced apart at a distance from each other at a lower portion of each of plurality of fixed plates 10. FIG. 1 exemplarily illustrates three fixed plates 10 and three moving plates 20, but the number of fixed plates 10 and the number of moving plates 20 are not limited thereto.

The lowest fixed plate 10 among the plurality of fixed plates 10 may be disposed on a support 51 located in the heating furnace 50, and may be firmly fixed to the support 51 such as by being coupled to the support 51 by a fastening member 52 such as a bolt. A center opening may be defined by portions of the support 51, and the portions of the support 51 support edges of the fixed plate 10. The fastening member 52 is not limited to a bolt, and any structure that can firmly fix the fixed plate 10 to the support 51 is applicable.

The plurality of fixed plates 10 are integrally coupled by a vertical fixing portion 11. The vertical fixing portion 11 is provided between every two fixed plates 10 neighboring each other in an up and down direction, to connect the two neighboring fixed plates 10. The vertical fixing portions 11 between neighboring fixed plates 10 have the same height taken in the up and down direction, and the plurality of fixed plates 10 are separated by a constant distance from each other.

The vertical fixing portion 11 may have various shapes such as a column or a bar, where a length thereof is relatively larger than a width or cross-sectional dimension thereof. In FIG. 2, a vertical fixing portion 11 having a cylinder shape with an extended length and a circular cross-section, is located in each of four corners of the fixed plates 10 in a plan view, but the location and the shape of the vertical fixing portion 11 is not limited thereto.

The lowest fixed plate 10 among the plurality of fixed plates 10 is firmly fixed to the support 51 and the plurality of fixed plates 10 are integrally coupled by the vertical fixing portion 11, and therefore the plurality of fixed plates 10 can maintain an initial set location (e.g., height) within the heating furnace 50.

The plurality of moving plates 20 are respectively located under the plurality of fixed plates 10, and are integrally coupled by connection members 21 that maintain a non-contact state with the plurality of fixed plates 10. The connection member 21 is disposed between every two moving plates 20 neighboring in the up and down direction to connect the two moving plates 20. The connection members 21 between neighboring moving plates 20 have the same height, and the plurality of moving plates 20 are respectively separated from each other by a constant distance.

The connection member 21 may have various shapes such as a column or a bar, where a length thereof is relatively larger than a width or cross-sectional dimension thereof. In FIG. 2, connection members 21 having a cylinder shape are respectively disposed in four edges of the moving plate 20, but the location and the shape of the connection member 21 are not limited thereto.

Openings 12 are defined in at least one of the plurality of fixed plates 10. The openings 12 respectively surround the connection members 21 and thus do not contact the connection members 21. Inner walls of the openings 12 are spaced apart from outer surfaces of the connection members 21. In one exemplary embodiment, when the connection members 21 are cylinder-shaped, the diameter of each the opening 12 is greater than the diameter of a cross-section of each connection member 21.

The driver 40 may be coupled to the lowest moving plate 20 among the plurality of moving plates 20, and raises of lowers (e.g., in the up and down direction) the plurality of moving plates 20 within the heating furnace 50. The driver 40 may include a hydraulic cylinder that can generate high pressure, or may include an assembly of a driving motor and a gear box.

FIG. 1 exemplarily illustrates that the driver 40 includes a hydraulic cylinder 42 including a piston 41 coupled to the lowest moving plate 20 among the plurality of moving plates 20, and a hydraulic pump (P) 43.

A distance between the moving plate 20, and the fixed plate 10 located above the moving plate 20 in the up and down direction, is greater than a height of the mold 30 in the up and down direction while the plurality of moving plates 20 are at lowered state within the heating furnace 50. Therefore, the plurality of molds 30 can be arranged on the respective moving plates 20 while the plurality of moving plates 20 are in the lowered state. In an exemplary embodiment, a planar dimension of each moving plate 20 is larger in area than the sum of the areas of the plurality of molds 30, so that the plurality of molds 30 may be arranged thereon.

Figure 3:
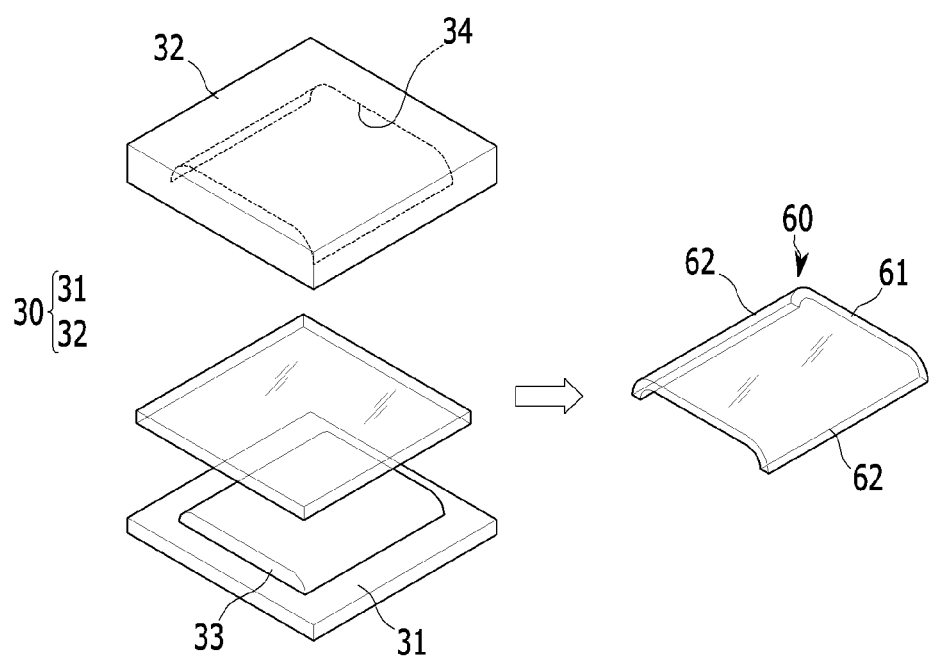
FIG. 3 is an exploded perspective view of an exemplary embodiment of a mold of the cover window manufacturing apparatus of FIG. 1.

FIG. 3 is an exploded perspective view of an exemplary embodiment of a mold of the cover window manufacturing apparatus shown in FIG. 1.

Referring to FIG. 3, a mold 30 includes a lower side mold portion 31 and an upper side mold portion 32, and an internal space having the same shape of a cover window that is to be manufactured is formed between the lower side mold portion 31 and the upper side mold portion 32.

In one exemplary embodiment, for example, the lower side mold portion 31 may include a convex portion 33, and the upper side mold portion 32 may include a concave portion 34 which is configured to receive a predetermined distance of thickness of the convex portion 33. Alternatively, the convex portion 33 may be included in the upper side mold portion 32 and the concave portion 34 may be included in the lower side mold portion 31.

Each of the convex portion 33 and the concave portion 34 may be formed by a flat surface and a curved surface. Where the convex portion 33 and the concave portion 34 are formed by a flat surface and a curved surface, a cover window 60 may be formed to include a flat portion 61, and curved portions 61 located at opposing sides of the flat portion 61.

The cover window 60 may have various shapes. In one exemplary embodiment, for example, the cover window 60 may include only one curved portion, may include a plurality of curved portions which are connected to and continuous with each other, or may include curved portions connected to four edges of the flat portion. The convex portion 33 and the concave portion 34 have appropriate profiles according to the shape of a manufactured cover window 60.

Referring back to FIG. 1, the plurality of molds 30 are closely disposed on the fixed plates 10 and attached to the fixed plates 10 such that the plurality of molds 30 are pressed when the plurality of moving plates 20 are lifted in the up direction to contact a fixed plate 10 disposed thereabove. The driver 40 moves the plurality of moving plates 20 to provide a pressure which presses the plurality of molds 30 for molding of a cover window, for a predetermined time period. Since the moving plates 20 are integrally connected to each other by the connection members 21, the moving plates 20 may each be moved at substantially a same time under operation of the driver 40. Since the moving plates 20 are integrally connected to each other, substantially a same pressure may be applied to the plurality of molds 30 under operation of the driver 40.

Figure 4:
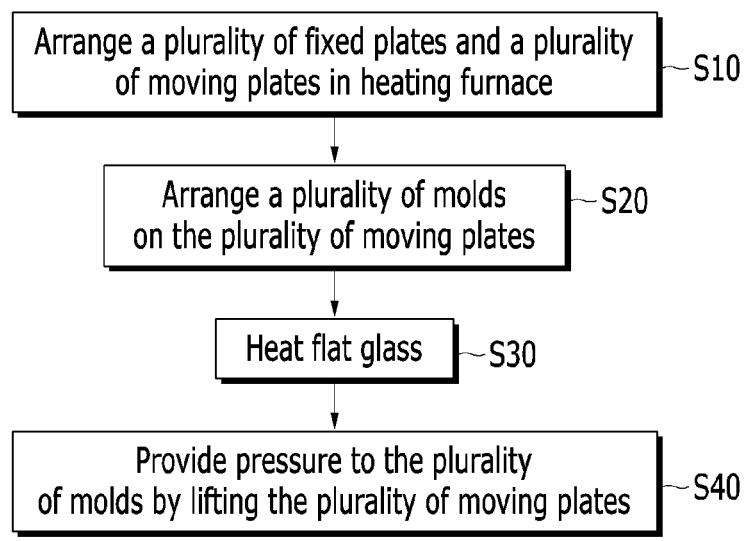
FIG. 4 is a process flowchart illustrating an exemplary embodiment of a cover window manufacturing method according to the invention.

FIG. 4 is a process flowchart of an exemplary embodiment of a cover window manufacturing method according to the invention.

Referring to FIG. 1 to FIG. 4, a method for manufacturing a cover window 60 includes arranging a plurality of fixed plates 10 and a plurality of moving plates 20 in a heating furnace 50 (S10), arranging a plurality of molds 30 (S20), installing a flat glass 65 on each of the plurality of moving plates 20, heating the flat glass 65 (S30) by operating the heating furnace 50, and providing a pressure to the molds 30 which are disposed between a respective fixed plate 10 and a respective moving plate 20 with a force generated by lifting the plurality of moving plates 20 (S40).

In S10, the plurality of fixed plates 10 and the plurality of moving plates 20 are disposed in the above-stated structure, and a driver 40 is coupled to the lowest moving plate 20 among the plurality of moving plates 20 to lift in an up direction or lower in a down direction, the plurality of moving plates 20. The plurality of fixed plates 10 are maintained in an initial set location (e.g., height) within the heating furnace 50, and the plurality of moving plates 20 are respective maintained in a lower location (e.g., height) in the heating furnace 50 with respect to the fixed plates 10.

In S20, molds 30 each including a lower side mold portion 31 and an upper side mold portion 32 are disposed on the moving plates 20. The lower side mold portion 31 among the lower side mold portion 31 and the upper side mold portion 32 is disposed on the moving plate 20, while the flat glass 65 and the upper side mold portion 32 are in a layered state with respect to the lower side mold portion 31. That is, in order, the lower side mold portion 31, the flat glass and the upper side mold portion 32 of a mold 30 are disposed on a respective moving plate 20. A planar dimension of each moving plate 20 is greater than the sum of the areas of the plurality of molds 30, and thus a group of molds 30 may be arranged on a respective single moving plate 20. In one exemplary embodiment, the group of molds 30 may be arranged in rows and columns respectively parallel to each other as illustrated in FIG. 2, but the invention is not limited thereto.

In S30, an internal temperature of the heating furnace 50 is increased from an initial temperature to a glass molding temperature. The glass molding temperature may be, for example, about 700 degrees Celsius (° C.) to about 1000° C. By such a heating, the flat glass 65 provided between portions of the mold 30 becomes soft enough to be deformed and therefore molded.

Figure 5:
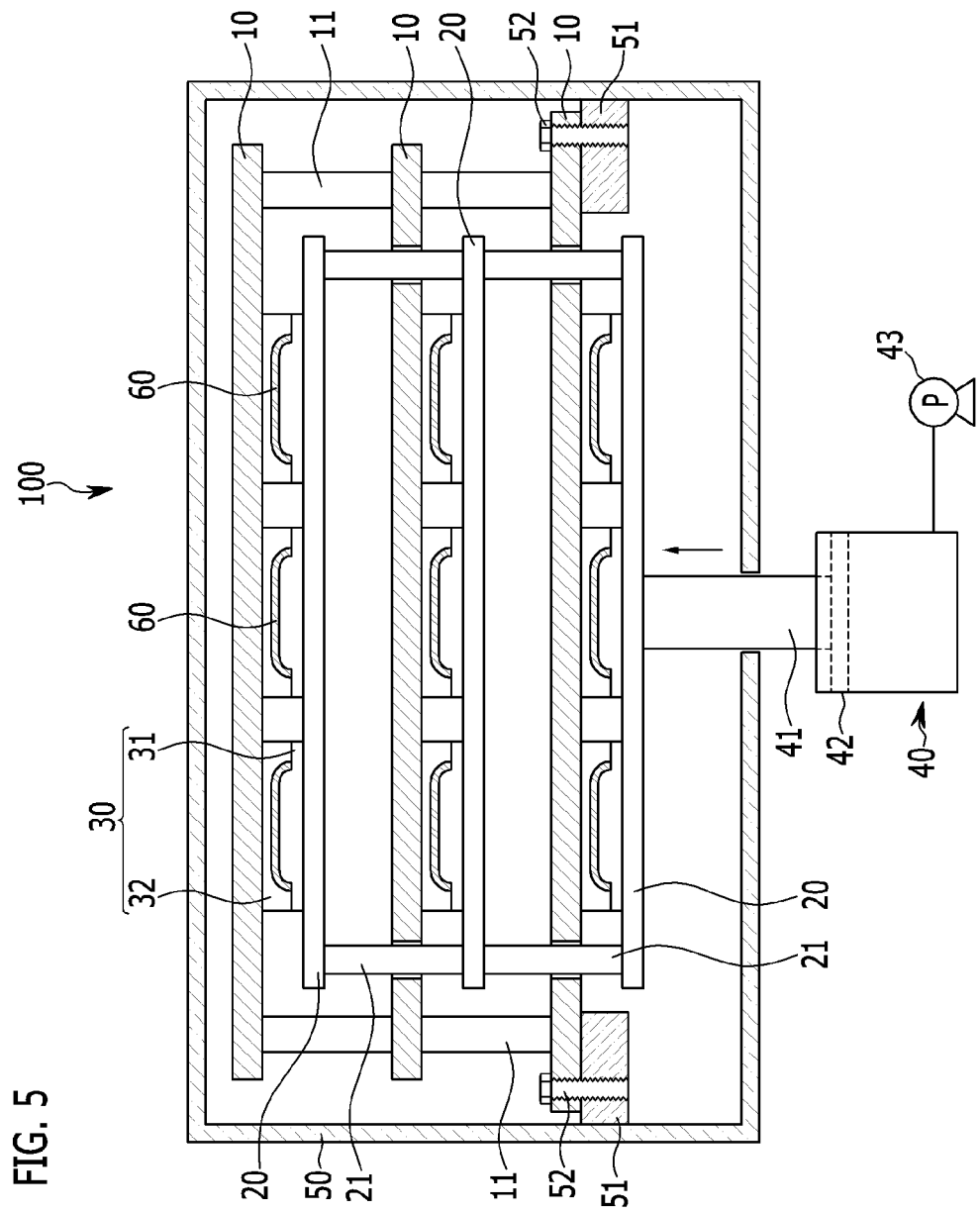
FIG. 5 is a schematic diagram of an exemplary embodiment of a cover window manufacturing apparatus in S40 of FIG. 4.

FIG. 5 is a schematic diagram of an exemplary embodiment of a cover window manufacturing apparatus in S40 of FIG. 4.

Referring to FIG. 5, in S40, the driver 40 is operated and a piston 41 is lifted so that the plurality of moving plates 20 is lifted as indicated by the upward arrow. Then, the plurality of molds 30 are closely attached to and contacted with the respective fixed plate 10 thereabove, and thus a relatively strong pressure is applied thereto since the plurality of molds 30 are between the lifted moving plate 20 and the respective fixed plate 10. Accordingly, the flat glass 65 in the mold 30 is molded to form the cover window 60 while being deformed to the same shape of the inner space of the mold 30.

After S40, the plurality of molds 30 may be brought to a room temperature and the cover window 60 is separated from the mold 30. A surface polishing process may be performed on the molded cover window 60 and the surface hardness thereof can be increased by a chemical treatment as necessary.

According to one or more exemplary embodiment of the above-described cover window manufacturing apparatus 100 and the manufacturing method thereof, the plurality of moving plates 20 have a layered structure so that a larger number of molds 30 can be within the heating furnace 50 at a same time, and the plurality of molds 30 can be simultaneously pressed by using a single driver 40. Therefore, a larger number of cover windows can be manufactured within a predetermined process time, thereby enabling mass production of the cover windows.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cover window manufacturing apparatus comprising:
a plurality of fixed plates layered and spaced apart at a distance from each other;
a plurality of moving plates layered and spaced apart at a distance from each other, and respectively disposed under the plurality of fixed plates,
a plurality of connection members which integrally connects the plurality of moving plates with each other;
a plurality of molds respectively provided on the plurality of moving plates, and inner spaces for molding the cover window respectively defined in the plurality of molds; and
a driver coupled to one of the plurality of moving plates, and configured to move the plurality of moving plates towards the plurality of fixed plates such that the plurality of molds are pressed to the plurality of fixed plates.

2. The cover window manufacturing apparatus of claim 1, further comprising a heating member,
wherein the plurality of fixed plates, the plurality of moving plates and the plurality of molds are disposed in the heating member.

3. The cover window manufacturing apparatus of claim 2, further comprising a plurality of vertical fixing portions which integrally connects the plurality of fixed plates to each other, wherein lengths of the plurality of vertical fixing portions are the same such that the distance between adjacent fixed plates is maintained.

4. The cover window manufacturing apparatus of claim 3, further comprising a support in the heating member and to which the lowest fixed plate among the plurality of fixed plates is fixed,
wherein the lowest fixed plate is coupled to the support in the heating member via a fastening member.

5. The cover window manufacturing apparatus of claim 2, lengths of the plurality of connection members are the same such that the distance between adjacent moving plates is maintained.

6. The cover window manufacturing apparatus of claim 5, wherein a group of more than one mold is disposed on the each moving plate among the plurality of moving plates.

7. The cover window manufacturing apparatus of claim 5, wherein openings are defined in at least one of the fixed plates among the plurality of fixed plates and through which the plurality of connection members respectively extend.

8. The cover window manufacturing apparatus of claim 2, wherein the driver comprises:
a hydraulic cylinder comprising a piston coupled to the lowest moving plate among the plurality of moving plates, and
a hydraulic pump configured to provide a hydraulic pressure to the hydraulic cylinder.

9. The cover window manufacturing apparatus of claim 1, wherein each mold among the plurality of molds comprises:
a lower side mold portion comprising one of a convex portion and a concave portion, and
an upper side mold portion comprising the other one of the convex portion and the concave portion.

10. The cover window manufacturing apparatus of claim 9, wherein the lower side mold portion further comprises a first flat surface, and, the upper side mold portion comprises a second flat surface.

11. A method for manufacturing a cover window, comprising:
arranging a plurality of fixed plates and a plurality of moving plates in a heating member;
arranging a plurality of molds, each comprising a lower side mold portion, and an upper side mold portion facing the lower side mold portion, on the plurality of moving plates,
interposing a flat cover window material respectively between facing lower and upper side mold portions of the plurality of molds;
heating the flat cover window material by operating the heating member; and
moving the plurality of moving plates toward the plurality of fixed plates, respectively, to apply a molding pressure to the plurality of molds by pressing the plurality of molds to the plurality of fixed plates.

12. The method for manufacturing the cover window of claim 11, wherein
a location of the plurality of fixed plates in the heating member is constant, and the moving the plurality of moving plates comprises operating a driver coupled to the plurality of moving plates and configured to lift or lower the plurality of moving plates.

13. The method for manufacturing the cover window of claim 11, wherein
the lower side mold portion comprises one of a convex portion and a concave portion,
the upper side mold portion comprises the other one of the convex portion and the concave portion, and
the applying the molding pressure to the plurality of molds forms the cover window material comprising a flat portion and a curved portion.

14. The method for manufacturing the cover window of claim 11, wherein the moving the plurality of moving plates toward the plurality of fixed plates, respectively, applies the molding pressure to each mold among the plurality of molds at substantially the same time.

* * * * *